(12) United States Patent
Moon et al.

(10) Patent No.: US 10,886,966 B2
(45) Date of Patent: Jan. 5, 2021

(54) METHOD FOR ELIMINATING PASSIVE INTER-MODULATION DISTORTION AND ANTENNA APPARATUS USING THE SAME

(71) Applicant: KMW INC., Hwaseong-si (KR)

(72) Inventors: Young Chan Moon, Hwaseong-si (KR); Min Seon Yun, Hwaseong-si (KR); Sung-hwan So, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 16/416,041

(22) Filed: May 17, 2019

(65) Prior Publication Data

US 2019/0280732 A1     Sep. 12, 2019

Related U.S. Application Data

(63) Continuation of application No. PCT/KR2017/013890, filed on Nov. 30, 2017.

(30) Foreign Application Priority Data

Nov. 30, 2016 (KR) .................. 10-2016-0161449

(51) Int. Cl.
*H04B 1/10* (2006.01)
*H04B 1/7097* (2011.01)
(Continued)

(52) U.S. Cl.
CPC .......... *H04B 1/7097* (2013.01); *H01Q 1/246* (2013.01); *H01Q 1/525* (2013.01); *H04B 7/14* (2013.01);
(Continued)

(58) Field of Classification Search
CPC ........ H04B 1/7097; H04B 17/40; H04B 7/14; H04B 2201/709718; H01Q 1/246; H01Q 1/525; H04W 88/085
(Continued)

(56) References Cited

U.S. PATENT DOCUMENTS 5,757,246 A * 5/1998 Johnson ................. H01Q 1/246
                                                          333/12
9,548,775 B2 * 1/2017 Smith .................... H04B 1/109
(Continued)

FOREIGN PATENT DOCUMENTS

| KR | 10-2012-0061145 A | 6/2012 |
|---|---|---|
| KR | 10-1449730 B1 | 10/2014 |
| WO | 2016-108450 A1 | 7/2016 |

OTHER PUBLICATIONS

International Search Report for PCT/KR2017/013890 dated Feb. 27, 2018 and its English translation.

*Primary Examiner* — Sonny Trinh

(57) ABSTRACT

Disclosed herein are a method for eliminating passive inter-modulation distortion (PIMD) and an antenna apparatus using the same. According to an embodiment, the antenna apparatus includes a main antenna used for transmission and reception of an RF signal; an auxiliary antenna used for reception of an RF signal; and a passive intermodulation distortion (PIMD) eliminator configured to calculate PIMD contained in a received signal of the main antenna using a received signal of the auxiliary antenna, and to eliminate the calculated PIMD from the received signal of the main antenna.

15 Claims, 5 Drawing Sheets

(51) Int. Cl.
  *H01Q 1/24* (2006.01)
  *H01Q 1/52* (2006.01)
  *H04W 88/08* (2009.01)
  *H04B 17/40* (2015.01)
  *H04B 7/14* (2006.01)

(52) U.S. Cl.
  CPC .......... *H04B 17/40* (2015.01); *H04W 88/085* (2013.01); *H04B 2201/709718* (2013.01)

(58) Field of Classification Search
  USPC ........................................................ 455/295
  See application file for complete search history.

(56) References Cited

U.S. PATENT DOCUMENTS

| | | | |
|---|---|---|---|
| 10,249,940 B2* | 4/2019 | Moon | ...................... H01Q 1/46 |
| 2010/0052652 A1 | 3/2010 | Mitchell et al. | |
| 2013/0172056 A1 | 7/2013 | Kim | |
| 2018/0006363 A1* | 1/2018 | Moon | .................... H01Q 1/246 |

* cited by examiner

METHOD FOR ELIMINATING PASSIVE INTER-MODULATION DISTORTION AND ANTENNA APPARATUS USING THE SAME

CROSS-REFERENCE TO RELATED APPLICATION(S)

This application is a continuation of International Application No. PCT/KR2017/013890, filed on Nov. 30, 2017, which claims priority to Korean Patent Application No. 10-2016-0161449, filed on Nov. 30, 2016, the entire content of which is incorporated herein by reference.

RELATED ART

Technical Field

Embodiments of the present disclosure relate to a method for eliminating passive intermodulation distortion (PIMD) and an antenna apparatus using the same.

Discussion

The statements in this section merely provide background information related to the present disclosure and may not constitute prior art.

In frequency division duplexing (FDD), a transmission frequency and a reception frequency at which a wireless communication transceiver operates are separated to perform transmission and reception at the same time. Generally, the transmission signal and the reception signal exhibit a large difference in power. Since a transmission signal should be transmitted to a receiver located at a long distance, the signal is amplified to high power before the signal is transmitted. On the other hand, a reception signal reaches an antenna after the transmission signal of the counterpart is greatly attenuated as it undergoes natural attenuation in the air and reflection on various geographic and terrain features. As a result, the difference in power between the transmission and reception signals may exceed 100 dB. When the difference in power between the transmission and reception signals becomes severe, a minute leakage signal of the transmission signal becomes unignorable as compared with the reception signal. For example, when the spectrum of output power of the transmit power amplifier spreads and noise falls in the receive band, the noise will cause serious interference with the reception signal, thereby hindering normal reception.

It is necessary to prevent the leakage power caused by the spread spectrum of the output power of the power amplifier and the noise power amplified by the power amplifier from falling in the receive band and interfering with the reception signal. Generally, this problem is prevented by passing the output signal of the power amplifier through a transmission filter.

However, in real equipment, the power amplifier signal that passes through the transmission filter often causes fine nonlinear distortion in a passive component end of the antenna. Nonlinear distortion usually occurs in active devices, but intermodulation distortion (IMD) occurs even in a radio frequency (RF) passive devices due fine nonlinear operation of the RF passive devices, whose operation is not perfectly linear. This distortion is referred to as passive intermodulation distortion (PIMD). The distortion causes some leaking power to fall in the receive band, thus acting as interference in the receive band.

The conventional method for eliminating such PIMD is unsatisfactory. A common method is to alleviating the PIMD by strengthening the assembly of the external cases of the antenna, enhancing grounding of signals and manually tuning of the antenna. This method requires a large cost and a long time of manufacturing an antenna, which has been pointed out as a drawback.

SUMMARY

It is one object of the present disclosure to provide an apparatus capable of eliminating passive intermodulation distortion (PIMD) included in a received signal of an antenna apparatus by adding a separate antenna element to the antenna apparatus of an existing wireless communication transceiver.

In accordance with one aspect of the present disclosure, provided is an antenna apparatus for transmission and reception of a radio frequency (RF) signal, the antenna apparatus including a main antenna used for transmission and reception of an RF signal, an auxiliary antenna used for reception of an RF signal, and a passive intermodulation distortion (PIMD) eliminator configured to calculate PIMD contained in a received signal of the main antenna using a received signal of the auxiliary antenna, and to eliminate the calculated PIMD from the received signal of the main antenna.

Embodiments of the antenna apparatus may further include one or more of the following features.

According to another embodiment of the present disclosure, the PIMD eliminator may operate in an RF frequency domain.

According to another embodiment of the present disclosure, the main antenna may be an array antenna including a plurality of transmission and reception antenna elements.

According to another embodiment of the present disclosure, the auxiliary antenna may be configured to be electromagnetically isolated from the main antenna.

According to another embodiment of the present disclosure, the main antenna may be configured as a multi-band antenna connected to a plurality of antenna ports, and the PIMD eliminator may calculate the PIMD for each band in a time division manner.

According to another embodiment of the present disclosure, the PIMD eliminator may performs operations of calculating an adjustment factor for the received signal of the auxiliary antenna using the received signal of the main antenna; adjusting at least one of a delay characteristic, a phase characteristic, and a gain characteristic of the received signal of the auxiliary antenna using the adjustment factor; and calculating the PIMD by subtracting the adjusted received signal of the auxiliary antenna from the received signal of the main antenna.

According to another embodiment of the present disclosure, the antenna apparatus may further include a remote radio head (RRH) electrically connected to the main antenna, wherein the PIMD eliminator may be included in the RRH.

In accordance with another aspect of the present disclosure, provided is a method of eliminating passive intermodulation distortion (PIMD) in an antenna apparatus having a main antenna used for transmission and reception of a radio frequency (RF) signal and an auxiliary antenna used for reception of an RF signal, the method including receiving a signal by the main antenna and the auxiliary antenna, calculating PIMD contained in the received signal of the main antenna using the received signal of the auxiliary antenna, and subtracting the calculated PIMD from the received signal of the main antenna and eliminating the PIMD from the received signal of the main antenna.

As is apparent from the above description, according to the present disclosure, passive intermodulation distortion (PIMD) of a received signal may be eliminated more precisely. Thereby, the quality of the received signal may be improved.

In addition, according to the present disclosure, the quality of a received signal may be improved without mitigating the PIMD through manual tuning of the antenna. Accordingly, the manufacturing time of the antenna may be reduced.

DESCRIPTION OF THE PREFERRED EMBODIMENTS

Hereinafter, at least one embodiment of the present disclosure will be described in detail with reference to the accompanying drawings.

One embodiment of the present disclosure is a technique related to elimination of an interference effect due to passive intermodulation (PIM), which occurs in a cellular wireless communication system such as a GSM, 3G (UMTS), or LTE network. The embodiment of the present disclosure may also be applied to other types of wireless communication networks, such as, for example, IEEE 802.16 WiMax, and are not necessarily limited to cellular wireless communication systems. Further, the embodiment of the present disclosure may be applied even to elimination of mutual interference occurring in an active device in some cases.

Figure 1:
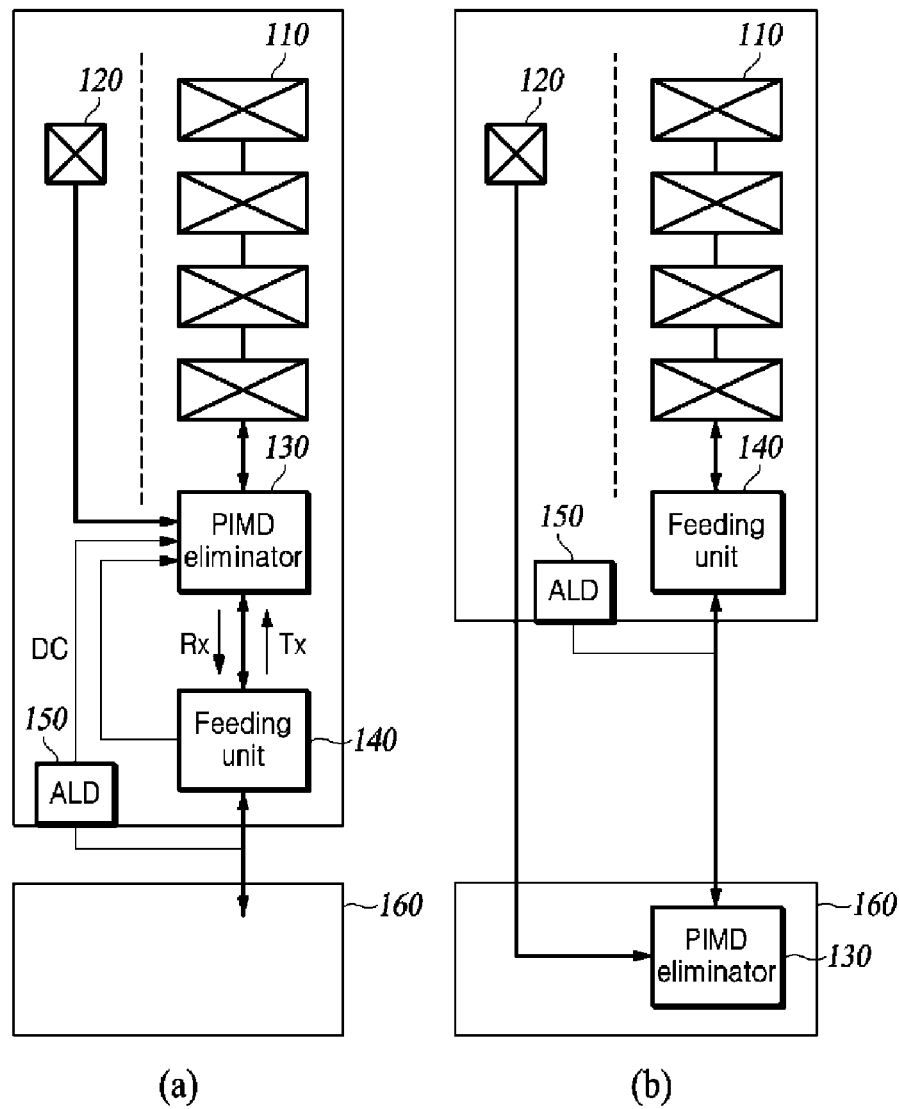
FIG. 1 is a schematic diagram of an antenna apparatus according to an embodiment of the present disclosure.

FIG. 1 is a schematic diagram of an antenna apparatus according to an embodiment of the present disclosure. FIG. 1(a) illustrates a case where a passive intermodulation distortion (PIMD) eliminator 130 is located inside an antenna module, and FIG. 1(b) illustrates a case where the PIMD eliminator 130 is located inside a remote radio head (RRH) 160. Each of the components shown in FIG. 1 may be implemented as a hardware chip, or may be implemented as software such that a microprocessor executes the functions corresponding to the respective components. In an embodiment of the present disclosure, the antenna module refers not only to an antenna element but also to a complex structure that functions to transmit and receive a wireless signal and to perform signal processing therefor. The RRH 160 refers to a relay device that is arranged between a base station and a mobile communication terminal of the mobile communication system to function to receive a weak signal, amplify or retransmit the weak signal, shape a distorted waveform, and re-adjust the timing. The antenna apparatus 100 is an apparatus including both the antenna module and the RRH 160, and is connected to the base station system in a wired or wireless manner or in a combination of the wire/wireless manners.

The antenna apparatus 100 is connected to a base station (not shown) in a wireless communication system to transmit and receive radio frequency (RF) signals. The base station performs basic transmission and reception RF signal processing and transmits an RF signal through a feed cable (not shown) connected to an antenna port (not shown). In addition, the base station transmits a direct current (DC) power signal, which is operating power for driving an antenna line device (ALD) 150 in a master control unit (MCU) (not shown) included in the base station, and transmits a control signal for controlling the ALD 150. That is, the antenna apparatus 100 receives an RF signal, a DC power signal, and a control signal from the base station.

The antenna apparatus 100 may include a main antenna 110, an auxiliary antenna 120, and a PIMD eliminator 130. The antenna apparatus 100 may further include a feeding unit 140 configured to feed power for transmission and reception of an RF signal, and the ALD 150 configured to control the antennas. The main antenna 110 and the auxiliary antenna 120 may be designed to be physically isolated from each other in the antenna module, and the elements constituting the respective antennas may be designed differently. The radiation structure of the antennas included in the antenna apparatus 100 may have various shapes and structures. In the figure, the main antenna 110 is illustrated as having multiple radiation elements which are vertically arranged. However, embodiments are not limited thereto.

The main antenna 110 is used to transmit and receive RF signals and may include a plurality of transmission/reception antenna elements configured to communicate with the base station. The main antenna 110 may be configured in the form of an array antenna having a plurality of antenna elements arranged in the longitudinal direction. The main antenna may have a multi-band antenna structure in which a plurality of antenna arrays is mounted on a single reflector. The main antenna 110 may be configured as a multi-band antenna connected to a plurality of antenna ports.

Signals may be transmitted and received simultaneously through the main antenna 110. In the signal reception process on the main antenna 110, PIMD may occur due to the difference in frequency band and power between the transmitted signal and the received signal. Accordingly, the signal received through the main antenna 110 is subjected to signal processing in the PIMD eliminator 130 to eliminate the PIMD component from the signal.

The auxiliary antenna 120 is used to receive an RF signal. The auxiliary antenna 120 is designed so as to prevent PIMD from occurring on the reception path of the signal. For example, unlike the main antenna 110, which is constituted by transmission/reception antenna elements, the auxiliary antenna 120 may include a reception-dedicated antenna element. In addition, the auxiliary antenna 120 is designed to be electromagnetically isolated from the main antenna 110. Since the received signal on the auxiliary antenna 120 is not involved in information communication with the base station, the auxiliary antenna 120 may be implemented as a relatively simple antenna element.

As described above, the auxiliary antenna 120 is designed to be electromagnetically isolated from the main antenna 110, and accordingly may receive a signal without being influenced by PIMD occurring on the main antenna 110. The received signal of the auxiliary antenna 120 is transmitted to the PIMD eliminator 130 so as to be adjusted. The adjusted signal is used to calculate the PIMD included in the received signal of the main antenna 110.

The PIMD eliminator 130 is located on the signal path of the main antenna 110 and the signal path of the auxiliary antenna 120 to eliminate the PIMD component included in the received signal of the main antenna 110. The PIMD eliminator 130 may be located inside the antenna module as shown in FIG. 1(a), or may be located inside the RRH 160, which is outside the antenna module, as shown in FIG. 1(b).

As shown in FIG. 1(a), when the PIMD eliminator 130 is located inside the antenna module, signal processing is performed in an RF frequency range. The received signal on the main antenna 110 and the received signal on the auxiliary antenna 120 are both in the RF frequency range and correspond to analog signals that are not digitized. That is, the PIMD eliminator 130 performs a function such as analog predistortion (PD). A signal transmitted through the main antenna 110 passes through the PIMD eliminator 130, but bypasses without any additional signal processing.

According to the present disclosure, the PIMD component included in the received signal on an antenna may be directly calculated and eliminated. Accordingly, operation may be performed regardless of the dynamic range of an analog-to-digital converter (ADC). When an algorithm for estimating the PIMD is used, an issue related to the dynamic range is raised by the difference in level between the received signal and the transmitted signal because the received signal and the transmitted signal usually need to be captured at the same time. According to the embodiment, since the PIMD is calculated by directly processing a signal in the RF frequency range, the issue related to the dynamic range is not raised. In addition, according to the embodiment, the RF terminal is capable of eliminating the PIMD component. Accordingly, no problem arises even when the band of the received signal and the band of the transmitted signal are far apart from each other.

The antenna apparatus 100 may further include an RRH 160 on the outside of the antenna module. The RRH 160 is electrically connected to the main antenna 110 to perform RF signal processing. The RRH 160, which is a repeater, is remote radio equipment connected to each antenna for a frequency band provided in the antenna module to transmit and receive signals to and from the antenna and the base station.

When the PIMD eliminator 130 is located inside the RRH 160 as shown in FIG. 1(b), the received signal of the main antenna 110 is transmitted to the PIMD eliminator 130 via the feeding unit 140. In this case, the received signal of the main antenna 110 and the received signal of the auxiliary antenna 120, which are used in the PIMD eliminator 130, may be digital signals that have passed through the ADC in the signal processing process of the RRH 160. The signal transmitted through the main antenna 110 passes through the PIMD eliminator 130, but bypasses without any additional signal processing.

When the PIMD eliminator 130 is designed to be included in the RRH 160, a separate element for RF signal processing may not be provided in the antenna module, unlike the case where the PIMD eliminator 130 is included in the antenna module. In this case, the path of the received signal of the main antenna 110 and the path of the received signal of the auxiliary antenna 120 should be electromagnetically isolated until the signals reach the PIMD eliminator 130. Accordingly, a cable connecting the auxiliary antenna 120 and the RRH 160 to each other needs to be provided in addition to a cable connecting the main antenna 110 and the RRH 160.

The PIMD eliminator 130 may be connected between the antenna module and the RRH 160. In this case, the PIMD eliminator 130 is located on the signal path of the main antenna 110 and the signal path of the auxiliary antenna 120, and a signal having passed through the PIMD eliminator 130 is transmitted to the RRH 160 and subjected to RF signal processing.

The PIMD eliminator 130 may be supplied with a DC power signal separately through an antenna port connected to the base station and use the supplied DC power signal as operating power. That is, the antenna apparatus 100 receives an RF signal, a DC power signal, and a control signal from the base station, and the PIMD eliminator 130 may separate a DC power signal from the received signal and use the separated DC power signal as operating power.

The antenna apparatus 100 may further include an ALD 150 configured to perform an antenna control operation according to an antenna control signal transmitted from the base station. The ALD 150, which is a remote control device for controlling the antenna, corresponds to a remote electrical tilt (RET) unit configured to control the tilt of the antenna, a tower-mounted amplifier (TMA) configured to control the amplifier, a remote azimuth steering (RAS) configured to control the azimuth of the antenna, and a remote azimuth beamwidth (RAB) configured to control the beam width of the antenna. The PIMD eliminator 130 may receive a DC power signal that is to be used as operating power of the ALD 150 and use the DC power signal as the operating power.

When the main antenna 110 is configured as a multi-band antenna connected to a plurality of antenna ports, the PIMD eliminator 130 may perform the operation of calculating the PIMD for each band in a time division manner.

Figure 2A:
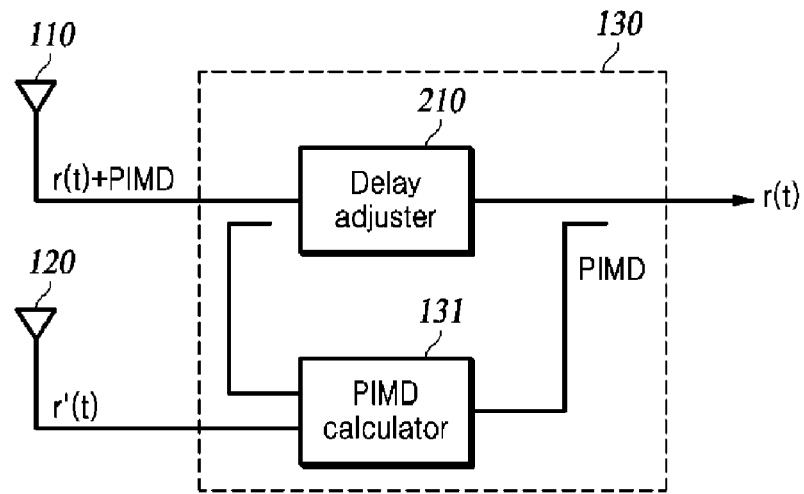
FIG. 2A and FIG. 2B are conceptual diagrams of a passive intermodulation distortion (PIMD) elimination method for an antenna apparatus according to an embodiment of the present disclosure.
Figure 2B:
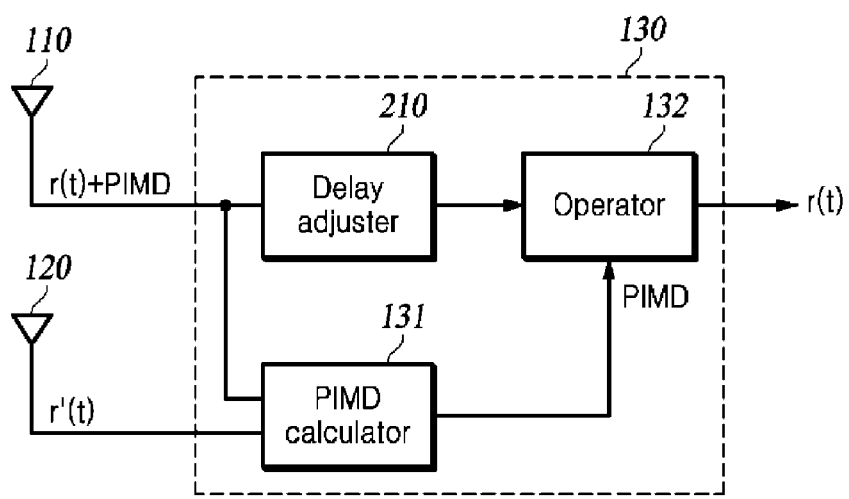

FIG. 2 is a conceptual diagram of a PIMD elimination method for an antenna apparatus according to an embodiment of the present disclosure. FIG. 2A illustrates a PIMD elimination method used when the PIMD eliminator 130 is located inside the antenna module, and FIG. 2B illustrates a PIMD elimination method used when the PIMD eliminator 130 is located inside an RRH. Each component shown in FIG. 2 may be implemented as a hardware chip. Alternatively, each component may be implemented as software and a microprocessor may be implemented to execute the functions of software corresponding to the respective components.

The antenna apparatus 100 according to an embodiment of the present disclosure has a plurality of signal paths corresponding to the main antenna 110 and the auxiliary antenna 120.

The antenna apparatus 100 may include a main antenna 110, an auxiliary antenna 120, a PIMD eliminator 130, and a delay adjuster 210. The PIMD eliminator 130 may include a PIMD calculator 131 and an operator 132.

The main antenna 110 serves to transmit and receive RF signals. Signals may be transmitted and received simultaneously through the main antenna 110. In this case, PIMD occurs in the received signal due to the difference in frequency band between the transmitted signal and the received signal and nonlinearity of the antenna element. More specifically, one or more signals transmitted through the main antenna 110 are superimposed. Thereby, intermodulation occurs in a nonlinear element, and an intermodulation signal component having a frequency other than the transmission band frequency is generated. Due to the components included in the frequency band of the received signal among the intermodulation signal components, the non-linear distortion component, which corresponds to the PIMD, is included in the received signal. As shown in FIG. 2, when a signal is received through the main antenna 110 that is used for both transmission and reception of a signal, a signal of r(t)+PIMD (also referred to as "received signal of the main antenna 110"), which is the sum of the received signal and PIMD, is obtained.

The auxiliary antenna 120 is separately added to calculate the PIMD component generated on the main antenna 110, and is designed not to generate PIMD on the signal reception path thereof. For example, the main antenna 110, which is designed as a signal reception-dedicated antenna dedicated to receiving signals, may be designed so as to be electromagnetically isolated while signal transmission and reception proceed therethrough. Unlike the main antenna 110, the auxiliary antenna 120 is used for the purpose of eliminating PIMD. A signal received through the auxiliary antenna 120 is a signal that is not mixed with PIMD, and corresponds to r'(t) in FIG. 2. The received signal r'(t) of the auxiliary antenna 120 differs from the received signal r(t) in gain and phase only, and may be expressed by Equation (1) below.

$$r'(t) = Ae^{j\theta} \times r(t) \quad \text{Equation 1}$$

When the PIMD eliminator 130 is located inside the antenna module as shown in FIG. 1(a), the PIMD eliminator 130 operates as shown in FIG. 2A. The PIMD eliminator 130 receives the received signal of the main antenna 110 and the received signal of the auxiliary antenna 120. In this case, each of the received signals corresponds to an RF signal. The PIMD calculator 131 obtains the RF received signal of the main antenna 110 using an RF coupler at the front end of the main antenna 110 and calculates the PIMD component in the received signal of the main antenna 110 using the received signal of the auxiliary antenna 120. The PIMD calculator 131 outputs the PIMD of the opposite phase in order to eliminate the calculated PIMD from the received signal of the main antenna 110. The PIMD of the opposite phase is inserted into the received signal of the main antenna 110 that has been subjected to delay adjustment 210. As a result, the PIMD eliminator 130 outputs r(t) obtained by eliminating the PIMD component from the received signal r(t)+PIMD of the main antenna 110.

As shown in FIG. 1(b), when the PIMD eliminator 130 is located inside the RRH 160 and signal processing is performed at a digital terminal, the PIMD eliminator 130 operates as shown in FIG. 2B. The PIMD eliminator 130 includes a PIMD calculator 131 and an operator 132. The PIMD calculator 131 calculates the PIMD component in the received signal of the main antenna 110, using the received signal of the auxiliary antenna 120, and the operator 132 subtracts the calculated PIMD component from the received signal of the main antenna 110 to restore the received signal without the PIMD. On the other hand, the transmitted signal sent to the main antenna 110 is bypassed. The operator 132 performs an operation of receiving the PIMD as a result from the PIMD calculator 131 and subtracting the PIMD from the received signal of the main antenna 110 that has been subjected to delay adjustment 210. A method by which in the PIMD calculator 131 calculates the PIMD by adjusting a delay characteristic, a gain characteristic, and a phase characteristic of the received signal r'(t) of the auxiliary antenna 120 will be described with reference to FIG. 3.

The PIMD calculator 131 of FIGS. 2A and 2B calculate the PIMD included in the received signal of the main antenna 110 through the same process. Specifically, the PIMD calculator 131 calculates an adjustment factor for adjusting a delay characteristic, a gain characteristic, and a phase characteristic of the received signal r'(t) of the auxiliary antenna 120, using the received signal r(t)+PIMD of the main antenna 110, and adjusts the delay characteristic, gain characteristic and phase characteristic of r'(t) to obtain the received signal r(t). Then, the PIMD calculator 131 calculates the PIMD by subtracting the adjusted received signal r(t) from r(t)+PIMD, which is the received signal of the main antenna 110.

Figure 3:
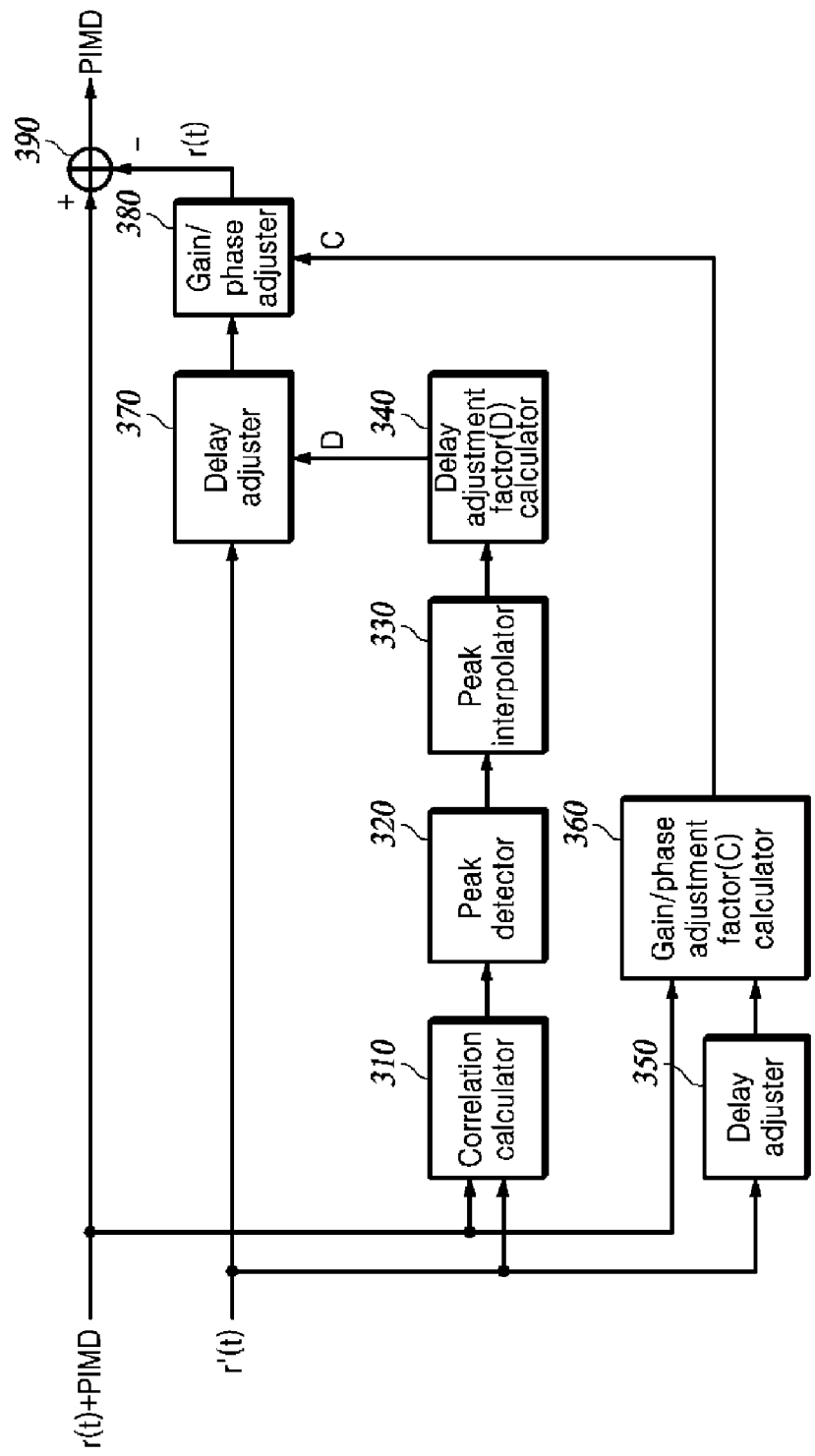
FIG. 3 is a conceptual diagram of a PIMD calculation method for an antenna apparatus according to an embodiment of the present disclosure.

FIG. 3 is a conceptual diagram of a PIMD calculation method for an antenna apparatus according to an embodiment of the present disclosure. Hereinafter, the procedure of the PIMD calculator 131 calculating the PIMD will be described in detail with reference to FIG. 3.

The PIMD calculator 131 calculates the PIMD using the signal received through the auxiliary antenna 120 in addition to the main antenna 110. As a shown in FIGS. 1 and 3, the PIMD calculator 131 receives the received signal r(t)+PIMD of the main antenna 110 and the received signal r'(t) of the auxiliary antenna 120 as input and calculates the PIMD. The received signal of the main antenna 110 and the received signal of the auxiliary antenna 120 may be RF frequency signals.

The PIMD calculator 131 performs an operation of adjusting the delay characteristic, the phase characteristic, and the gain characteristic of the received signal r'(t) of the auxiliary antenna 120 so as to be identical to those of the received signal r(t). The PIMD calculator 131 includes a correlation calculator 310, a peak detector 320, a peak interpolator 330, a delay adjustment factor calculator 340, a delay adjuster 350, a gain/phase adjustment factor calculator 360, a delay adjuster 370, a gain/phase adjuster 380, and a final operator 390.

The PIMD calculator 131 captures (or samples) r(t)+PIMD and r'(t) and stores the same in a memory.

The correlation calculator 310 calculates values of correlation between r(t)+PIMD and r'(t).

The peak detector 320 detects a peak among the calculated correlation values.

The peak interpolator 330 performs interpolation on the correlation values within a certain range around the detected peak.

The delay adjustment factor calculator 340 re-detects a peak among the interpolated correlation values and calculates a delay adjustment factor of the received signal r'(t) of the auxiliary antenna 120 on the basis of the re-detected peak. Due to the interpolation operation, a more accurate peak and a more accurate delay adjustment factor determined thereby may be calculated. Such an interpolation operation may be applied to the received signals or the like before a correlation value is calculated. However, by performing the interpolation operation on the correlation values for the non-interpolated signals, the operational burden on calculation of correlation value may be reduced, and the number of times of signal sampling may be reduced. The calculated delay adjustment factor is used to adjust the delay characteristic of r'(t) so as to be identical to the delay characteristic of the received signal r(t).

The gain adjustment factor and phase adjustment factor are also calculated in a similar manner to the delay adjustment factor.

The delay adjuster 350 applies the calculated delay adjustment factor to adjust the delay characteristic of r'(t).

The gain/phase adjustment factor calculator 360 compares the delay-adjusted r'(t) with r(t)+PIMD to estimate the gain and phase shift of the received signal r'(t) of the auxiliary antenna 120. The gain and phase shift are estimated using K consecutive samples. A gain adjustment factor and a phase adjustment factor C are calculated from the estimated gain and phase shift to make the received signal r'(t) of the auxiliary antenna 120 have the same gain and phase characteristics as the received signal r(t).

The delay adjuster 370 and the gain/phase adjuster 380 adjust the received signal r'(t) of the auxiliary antenna 120 so as to be identical to the received signal r(t), using the calculated delay adjustment factor D, the calculated gain adjustment factor and the calculated phase adjustment factor C. The final operator 390 calculates PIMD by subtracting r(t) obtained as an adjustment result from the received signal r(t)+PIMD of the main antenna 110. The adjustment refers to an operation of adjusting the gain and phase of one signal so as to be the same as the gain and phase of the other signal.

Figure 4:
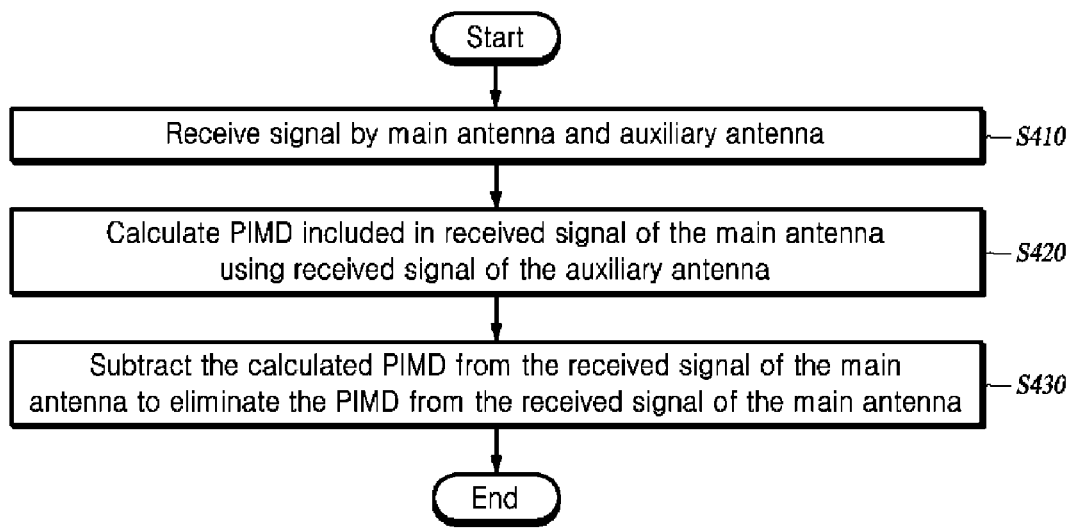
FIG. 4 is a flowchart of a method for eliminating PIMD according to an embodiment of the present disclosure.

FIG. 4 is a flowchart of a method for eliminating PIMD according to an embodiment of the present disclosure.

First, the main antenna 110 and the auxiliary antenna 120 receive a signal (S410). The received signal of the main antenna 110 contains PIMD due to the frequency band of the transmitted/received signal and the non-linearity of the antenna element. The auxiliary antenna 120 is designed not to cause PIMD in the reception path of the signal, and thus the received signal of the auxiliary antenna 120 does not contain the PIMD component. The received signal of the auxiliary antenna 120 differs in gain and phase only from a signal obtained by eliminating the PIMD component from the received signal of the main antenna 110.

The PIMD included in the received signal of the main antenna 110 is calculated using the received signal of the auxiliary antenna 120 in operation S420. Specifically, an adjustment factor for adjusting the delay characteristic, gain characteristic, and phase characteristic of the received signal of the auxiliary antenna 120 is calculated using the received signal of the main antenna 110. The delay characteristic, the gain characteristic, and the phase characteristic of the received signal of the auxiliary antenna 120 are adjusted using the adjustment factor. Then, the adjustment factor includes a delay adjustment factor, a gain adjustment factor, and a phase adjustment factor. Then, the PIMD is calculated by subtracting the adjusted received signal of the auxiliary antenna 120 from the received signal of the main antenna 110.

In operation S430, the calculated PIMD is subtracted from the received signal of the main antenna 110 to obtain a received signal with the PIMD eliminated from the received signal of the main antenna 110.

Figure 5:
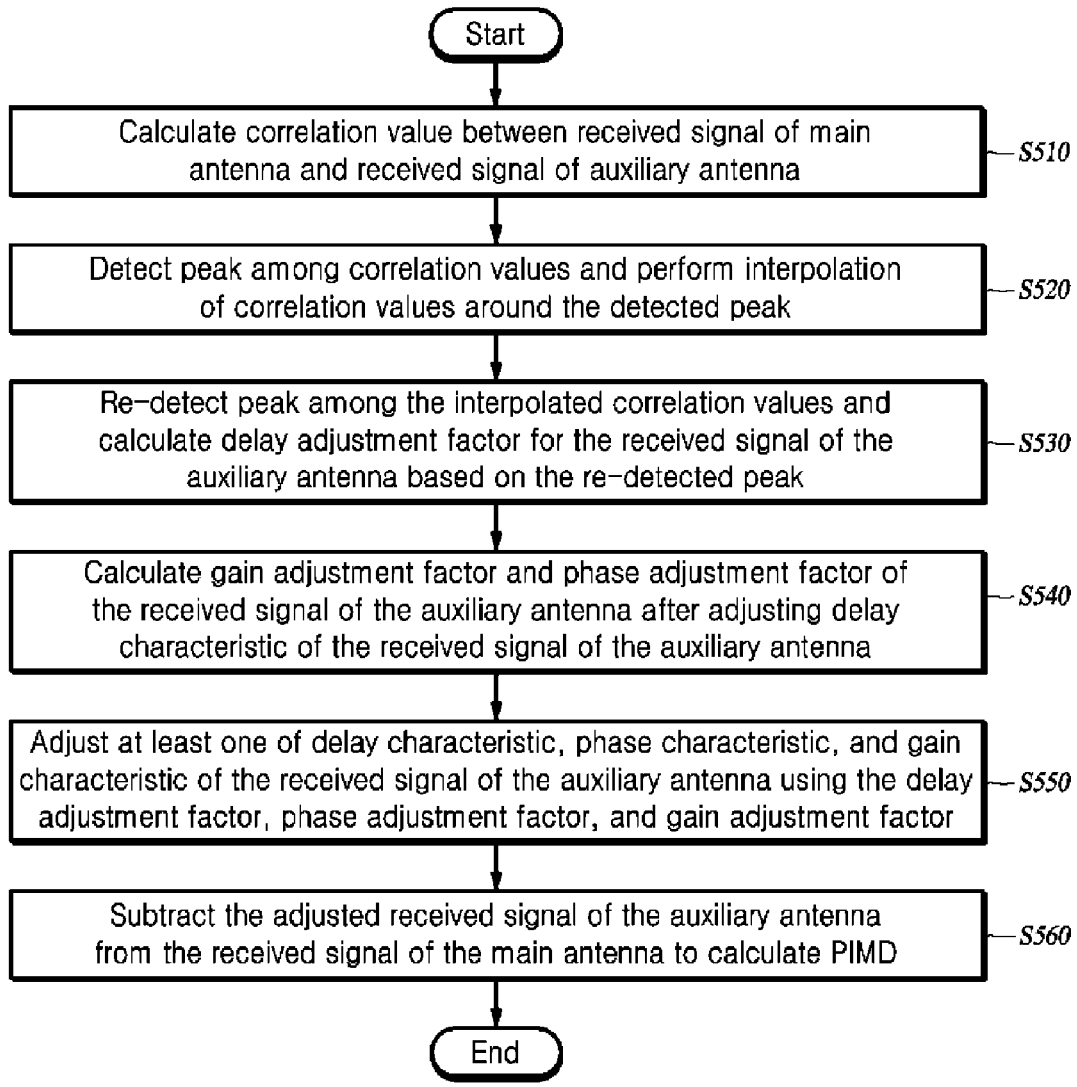
FIG. 5 is a flowchart of a method for calculating PIMD according to an embodiment of the present disclosure.

FIG. 5 is a flowchart of a method for calculating PIMD according to an embodiment of the present disclosure.

A correlation value between the received signal of the main antenna 110 and the received signal of the auxiliary antenna 120 is calculated (S510). The received signal of the main antenna 110 and the received signal of the auxiliary antenna 120 may be RF frequency signals.

A peak is detected among the calculated correlation values, and interpolation is performed on the correlation values within a certain range around the peak of the calculated correlation values (S520). A peak is re-detected among the interpolated correlation values, and a delay adjustment factor of the received signal of the auxiliary antenna 120 is calculated on the basis of the re-detected peak (S530).

In operation S540, a gain adjustment factor and a phase adjustment factor of the received signal of the auxiliary antenna 120 are calculated. The gain and phase shift of the received signal of the auxiliary antenna 120 are estimated by comparing the delay-adjusted received signal of the auxiliary antenna 120 with the received signal of the main antenna 110. Then, a gain adjustment factor and a phase adjustment factor for adjusting the received signal of the auxiliary antenna 120 so as to have the same gain and phase characteristics as the received signal of the main antenna 110 without the PIMD are calculated from the estimated gain and phase shift.

Operations S510 to S540 are performed to calculate an adjustment factor for adjusting the delay characteristic, the phase characteristic, and the gain characteristic of the received signal of the auxiliary antenna 120 so as to be identical those of a signal obtained by eliminating the PIMD from the received signal of the main antenna 110.

At least one of the delay characteristic, the phase characteristic, and the gain characteristic of the received signal of the auxiliary antenna 120 is adjusted using the calculated adjustment factors (S550). The PIMD contained in the received signal of the main antenna 110 is calculated by subtracting the adjusted received signal of the auxiliary antenna 120 from the received signal of the main antenna 110 (S560).

Although exemplary embodiments of the present disclosure have been described for illustrative purposes, those skilled in the art will appreciate that various modifications, additions and substitutions are possible, without departing from the idea and scope of the present disclosure. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

The invention claimed is:

1. An antenna apparatus for a base station, the antenna apparatus comprising:
   a main antenna to receive a first radio frequency (RF) signal;
   an auxiliary antenna to receive a second RF signal; and
   a passive intermodulation distortion (PIMD) eliminator configured to calculate PIMD contained in the first RF signal received by the main antenna based on the second RF signal received by the auxiliary antenna, and to eliminate the calculated PIMD from the first RF signal received by the main antenna.

2. The antenna apparatus of claim 1, wherein the PIMD eliminator operates in an RF frequency domain.

3. The antenna apparatus of claim 2, wherein the PIMD eliminator comprises:
   a first RF coupler arranged at a front end of the main antenna to capture the first RF signal received by the main antenna;
   a PIMD calculator configured to calculate the PIMD contained in the first RF signal received by the main antenna based on the second RF signal received by the auxiliary antenna and to output a PIMD of an opposite phase; and
   a second RF coupler configured to insert the PIMD of the opposite phase into the first RF signal received by the main antenna.

4. The antenna apparatus of claim 1, wherein the PIMD eliminator is supplied with a direct current (DC) power signal separated from an antenna port connected to the base station and uses the supplied DC power signal as operating power.

5. The antenna apparatus of claim 1, further comprising:
   an antenna line device (ALD) configured to perform an antenna control operation according to an antenna control signal transmitted from the base station,
   wherein the PIMD eliminator is supplied with a direct current (DC) power signal from the ALD and uses the supplied DC power signal as operating power.

6. The antenna apparatus of claim 1, wherein the PIMD eliminator performs operations of:
 calculating an adjustment factor for the second RF signal received by the auxiliary antenna based on the first RF signal received by the main antenna;
 adjusting at least one of a delay characteristic, a phase characteristic, and a gain characteristic of the second RF signal received by the auxiliary antenna based on the adjustment factor to generate an adjusted second RF signal; and
 calculating the PIMD by subtracting the adjusted second RF signal from the first RF signal received by the main antenna.

7. The antenna apparatus of claim 6, wherein the operation of calculating the adjustment factor comprises:
 calculating a correlation value between the first RF signal received by the main antenna and the second RF signal received by the auxiliary antenna.

8. The antenna apparatus of claim 7, wherein a peak is detected from the correlation value, and interpolation is performed on the correlation value based on the detected peak.

9. The antenna apparatus of claim 1, wherein the auxiliary antenna is designed not to generate the PIMD during reception of the second RF signal.

10. The antenna apparatus of claim 1, wherein the main antenna is configured as a multi-band antenna connected to a plurality of antenna ports,
 wherein the PIMD eliminator calculates the PIMD for each band in a time division manner.

11. The antenna apparatus of claim 1, further comprising:
 a remote radio head (RRH) electrically connected to the main antenna,
 wherein the PIMD eliminator is included in the RRH.

12. The antenna apparatus of claim 1, further comprising:
 a remote radio head (RRH) electrically connected to the main antenna,
 wherein the PIMD eliminator is connected between the RRH and the main antenna.

13. A method of eliminating passive intermodulation distortion (PIMD) in an antenna apparatus, the method comprising:
 receiving a first signal by a main antenna;
 receiving a second signal by an auxiliary antenna;
 calculating PIMD contained in the first signal received by the main antenna based on the second signal received by the auxiliary antenna; and
 subtracting the calculated PIMD from the first signal received by the main antenna and eliminating the PIMD from the first signal received by the main antenna.

14. The method of claim 13, wherein the calculating of the PIMD comprises:
 calculating an adjustment factor for the second signal received by the auxiliary antenna using based on the first signal received by the main antenna;
 adjusting at least one of a delay characteristic, a phase characteristic, and a gain characteristic of the second signal received by the auxiliary antenna based on the adjustment factor to generate an adjusted second signal; and
 calculating the PIMD by subtracting the adjusted second signal from the first signal received by the main antenna.

15. A method of calculating passive intermodulation distortion (PIMD) of a received signal in an antenna apparatus, the method comprising:
 calculating an adjustment factor for a second signal received by an auxiliary antenna based on a first signal received by a main antenna;
 adjusting at least one of a delay characteristic, a phase characteristic, and a gain characteristic of the second signal received by the auxiliary antenna based on the adjustment factor to generate an adjusted second signal; and
 calculating the PIMD by subtracting the adjusted second signal from the first signal received by the main antenna.

* * * * *